(12) United States Patent
Blondel et al.

(10) Patent No.: US 11,866,302 B2
(45) Date of Patent: Jan. 9, 2024

(54) METHOD TO OPTIMIZE AN ANTI-SWAY FUNCTION

(71) Applicant: Schneider Electric Industries SAS, Rueil Malmaison (FR)

(72) Inventors: Charles Blondel, Cras (FR); Yannick Bodin, Lachapelle d'Armentières (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 113 days.

(21) Appl. No.: 17/537,610

(22) Filed: Nov. 30, 2021

(65) Prior Publication Data
US 2022/0185634 A1 Jun. 16, 2022

(30) Foreign Application Priority Data
Dec. 15, 2020 (EP) ..................... 20306565

(51) Int. Cl.
*B66C 13/00* (2006.01)
*B66C 13/06* (2006.01)
(Continued)

(52) U.S. Cl.
CPC ............ *B66C 13/063* (2013.01); *G01B 21/22* (2013.01); *G01C 9/02* (2013.01); *G01C 19/00* (2013.01);
(Continued)

(58) Field of Classification Search
CPC ..... B66C 13/063; B66C 13/06; B66C 13/085; B66C 13/16; B66C 13/22; B66C 13/44;
(Continued)

(56) References Cited

U.S. PATENT DOCUMENTS

| 4,135,628 A | * | 1/1979 | Harris | ................... | B66C 13/063 |
| | | | | | 212/324 |
| 4,273,242 A | * | 6/1981 | Schaper | ................. | B66C 13/06 |
| | | | | | 212/319 |

(Continued)

FOREIGN PATENT DOCUMENTS

| DE | 102017125715 A1 | 5/2018 | | |
| EP | 3165493 A1 | * | 5/2017 | ............. B66C 13/06 |

(Continued)

OTHER PUBLICATIONS

Extended European Search Report and Search Opinion dated May 26, 2021 for corresponding European Patent Application No. 20306565. 1, 6 pages.

*Primary Examiner* — Emmanuel M Marcelo
(74) *Attorney, Agent, or Firm* — Locke Lord LLP

(57) ABSTRACT

For optimizing an anti-sway algorithm for the transport of a load by a hoisting appliance spanning a hoisting area and comprising a trolley, a reeving system and a tool handling the load, a control device is able to:
  create a first table giving angle offsets of the trolley, depending on physical characteristics of the load and on mechanical parameters related to the trolley, the angle offsets being determined by measurements of inclination angles of the trolley,
  create a second table giving probabilities of a secondary sway of the load depending on physical characteristics of the load, on mechanical parameters related to the reeving system and on measurements of acceleration and angular position of the tool, and
  transport the load in the hoisting area by using an anti-sway algorithm taking into account the first table and the second table, wherein anti-sway algorithm takes as inputs dynamic parameters of hoisting appliance com-
(Continued)

prising the current position of the trolley, the load and the current angle of the load with respect to the trolley.

14 Claims, 4 Drawing Sheets

(51) Int. Cl.
    *G01B 21/22*     (2006.01)
    *G01C 9/02*     (2006.01)
    *G01C 19/00*     (2013.01)
    *G01P 15/00*     (2006.01)
    *B66C 13/16*     (2006.01)
    *B66C 13/46*     (2006.01)

(52) U.S. Cl.
    CPC .............. *G01P 15/00* (2013.01); *B66C 13/16* (2013.01); *B66C 13/46* (2013.01)

(58) Field of Classification Search
    CPC .......... B66C 13/46; G01B 21/22; G01C 9/06; G01C 19/00; G01P 15/00
    See application file for complete search history.

(56) References Cited

U.S. PATENT DOCUMENTS

| | | | | |
|---|---|---|---|---|
| 5,150,799 | A * | 9/1992 | Long, Jr. ................. | B66C 19/00 |
| | | | | 212/319 |
| 5,538,382 | A * | 7/1996 | Hasegawa ............... | B66C 13/54 |
| | | | | 212/319 |
| 6,250,486 | B1 * | 6/2001 | Enoki .................... | B66C 19/002 |
| | | | | 212/87 |
| 2019/0112165 | A1 | 4/2019 | Palberg et al. | |
| 2020/0180917 | A1 | 6/2020 | Strahle | |

FOREIGN PATENT DOCUMENTS

| | | | |
|---|---|---|---|
| WO | WO-2013041770 A1 * | 3/2013 | ............. B66C 13/06 |
| WO | 2017174196 A1 | 10/2017 | |

* cited by examiner

METHOD TO OPTIMIZE AN ANTI-SWAY FUNCTION

FIELD OF INVENTION

The present invention generally relates to a method for an anti-sway function applied to a hoisting appliance that is spanning a warehouse, the hoisting appliance arranged for carrying a load suspended by cables from a trolley that can move with the hoisting appliance.

BACKGROUND

Hoisting appliances 1 such as bridge cranes, gantry cranes or overhead travelling cranes usually comprise a trolley 2 which can move over a single girder or a set of rails 3 along a horizontal axis X, as shown in FIG. 1. This first movement along the X-axis is generally referred to as short travel movement and/or trolley movement. Depending on the type of appliance, the girder or the set of rails 3, also referred to as bridge, may also be movable along a horizontal axis Y perpendicular to the X-axis, thus enabling the trolley to be moved along both the X- and Y-axes. This second movement along the Y-axis is generally referred to as long travel movement and/or bridge or crane movement. The amount of available short travel along the X-axis and long travel along the Y-axis determines a hoisting area that is spanned by the hoist 1.

A tool 4, also called load suspension device, is associated with a reeving system having cables which pass through the trolley 2, the length of the cables 5 being controlled by the trolley 2 to vary, thereby enabling displacement of a load 6 along a vertical axis Z, referred to as hoisting movement.

Transferring a suspended load across a warehouse, a hall, shipyard, metallurgic or nuclear plant, requires an operator to be very careful to prevent people, obstacles or objects that are present within the hoisting area from being hit or damaged in any way. Hence, in addition to size, swinging of the suspended load, commonly referred to as sway, is something that the operator needs to take in account when manoeuvring the load across the working place along a trajectory within the boundaries of the hoisting area. Moreover, secondary sway phenomena may occur and disturbs the normal operation of the hoisting.

This complexity is what has hampered development of fully automated hoisting systems being capable of transferring suspended loads independently along a trajectory. Some advanced antisway functions are difficult and time consuming to put in place, which is mainly due to the large number of parameters that are variable and specific for each crane. Accordingly, there is a need for developing cranes that perform optimized and easy closed loop antisway commissioning.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for optimizing an anti-sway algorithm for the transport of a load by a hoisting appliance spanning a hoisting area and comprising a trolley, a reeving system and a tool handling the load, the method comprising in a control device:

creating a first table giving angle offsets of the trolley, depending on physical characteristics of the load and on mechanical parameters related to the trolley, the angle offsets being determined by measurements of inclination angles of the trolley, creating a second table giving probabilities of a secondary sway of the load depending on physical characteristics of the load, on mechanical parameters related to the reeving system and on measurements of acceleration and angular position of the tool, transporting the load in the hoisting area by using an anti-sway algorithm taking into account the first table and the second table, wherein anti-sway algorithm takes as inputs dynamic parameters of hoisting appliance comprising the current position of the trolley, the load and the current angle of the load with respect to the trolley.

Accordingly, the anti-sway algorithm is optimized to reduce significantly sway of the load and thus to improves the mechanical stress of the crane and to increase the productivity and performance of operation of the hoisting appliance. The improved anti-sway algorithm takes into account the mechanical environment, the pendulum behavior of the tool with the load and time delays due to information processing by the chain of commands, which reduces commissioning time of anti-sway algorithm.

In an embodiment, the method further comprises creating a third table comprising global command delays depending on motion commands from the control device to the trolley, and wherein the anti-sway algorithm further takes into account the third table.

In an embodiment, the mechanical parameters related to the trolley include at least the position of the trolley.

In an embodiment, the physical characteristics of the load include at least the weight of the load.

In an embodiment, the mechanical parameters related to the reeving system include at least the length of a cable of the reeving system.

In an embodiment, the third table further comprises an angle measurement delay from an angle sensor linked to the trolley.

In an embodiment, the measurements of inclination angles of the trolley are performed by an inclinometer linked to the trolley.

In an embodiment, the measurements of acceleration and angular position of the tool are performed by an accelerometer and a gyroscope linked to the tool.

In an embodiment, the anti-sway algorithm uses the angle offsets of the first table for the given load and takes as inputs the current position of the trolley and the current angle of the load with respect to the trolley to determine real-time angle offsets to be taken in account for a regulation loop of the anti-sway algorithm.

In an embodiment, the anti-sway algorithm analyses the probabilities of secondary sway for the given load and adapts coefficients of a regulation loop when probabilities of secondary sway change with the length of the cable of the reeving system.

In an embodiment, the coefficients are link to correction factors of a regulation loop, a coefficient corresponding to a change of speed, an acceleration or a deceleration of the trolley.

In an embodiment, the anti-sway algorithm uses the third table to anticipate the trigger of motion commands that are effectively executed by the trolley after global command delays.

In another implementation, there is provided an apparatus for optimizing an anti-sway algorithm for the transport of a load by a hoisting appliance spanning a hoisting area and comprising a trolley, a reeving system and a tool handling the load, the apparatus comprising:
one or more network interfaces to communicate with a telecommunication network;
a processor coupled to the network interfaces and configured to execute one or more processes; and
a memory configured to store a process executable by the processor, the process when executed operable to:
create a first table giving angle offsets of the trolley leading to a primary sway of the load, depending on physical characteristics of the load and on mechanical parameters related to the trolley, the angle offsets being determined by measurements of inclination angles of the trolley,
create a second table giving probabilities of a secondary sway of the load depending on physical characteristics of the load, on mechanical parameters related to the reeving system and on measurements of acceleration and angular position of the tool,
transport the load in the hoisting area by using an anti-sway algorithm taking into account the first table and the second table, wherein anti-sway algorithm takes as inputs dynamic parameters of hoisting appliance comprising the current position of the trolley, the load and the current angle of the load with respect to the trolley.

In another implementation there is provided a computer-readable medium having embodied thereon a computer program for executing a method for optimizing an antisway function for the transport of a load by a hoisting appliance spanning a hoisting area and comprising a trolley, a reeving system and a tool handling the load. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
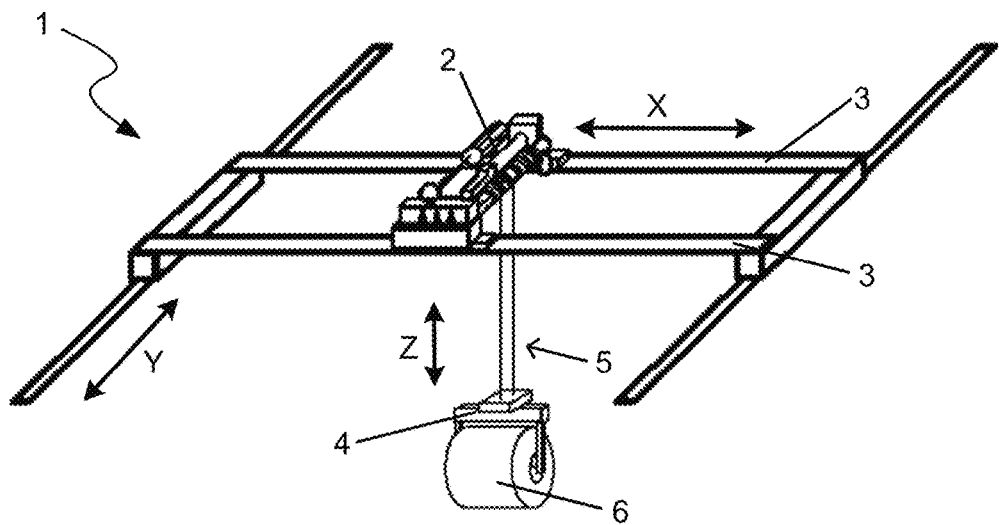
FIG. 1 shows schematically an example of a hoisting appliance.
Figure 2:
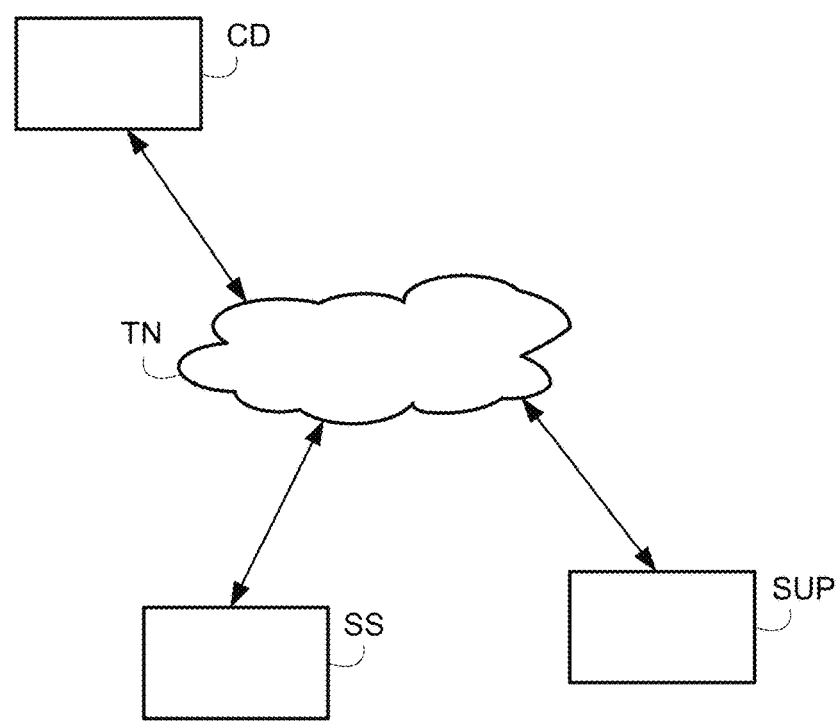
FIG. 2 shows schematically an example of a communication system for optimizing an anti-sway algorithm for the transport of a load by a hoisting appliance.

Referring to FIG. 2, a communication system for optimizing an anti-sway algorithm for the transport of a load by a hoisting appliance comprises a control device CD, a set of sensors SS and a supervisory system SUP.

A hoisting area, such as a warehouse, a yard, a hall, or other working area, is provided with a supervisory system SUP that is an IT control system for supervision of the hoisting area. The supervisory system provides information to the control device CD for trajectory execution, authorization i.e. access management, and security in general.

The control device CD is able to communicate with the supervisory system SUP and with the set of sensors SS through a telecommunication network TN. The telecommunication network may be a wired or wireless network, or a combination of wired and wireless networks. The telecommunication network can be associated with a packet network, for example, an IP ("Internet Protocol") high-speed network such as the Internet or an intranet, or even a company-specific private network. The control device CD may be Programmable Logic Controllers (PLC) and other automation device able to implement industrial processes and able to communicate with the supervisory system for exchanging data such as requests, inputs, control data, etc.

In one embodiment, the set of sensors SS includes a positioning system PS, an angle sensor AS, an inclinometer INC, an accelerometer ACC and a gyroscope GYR.

The positioning system PS may be linked to the trolley and is configured to measure the position of the trolley. In one embodiment, the positioning system PS, such as a radar system, including a radio emitter and a radio detector, can emit radio waves that will be reflected by structures of the surrounding environment, like a wall of the warehouse, that are to be detected by the detector of the radar. This will allow determining the distance between the trolley and the wall in both direction X and Y. This will allow determining the distance between the trolley and the rail reference position. In one embodiment, the positioning system PS is associated with the trolley and can determine the position of the trolley along the axis X and axis Y with respect to the short travel movement and/or trolley movement and with respect to the long travel movement and/or bridge or crane movement. In another embodiment, the positioning system PS comprises two radar systems, one being linked to the trolley for the axis X and the other one being linked to the gantry for the axis Y.

The inclinometer INC may be linked to the trolley and is configured to measure angle offsets of the trolley with respect to the horizontal plane, the angle offsets depending on physical characteristics of the load and on mechanical parameters related to the trolley. The physical characteristics of the load may be the weight of the load, the dimensions of the load and the center of gravity of the load. The mechanical parameters related to the trolley include at least the position of the trolley. The angle offsets of the trolley are due to some mechanical characteristics related to the global infrastructure of the crane, including for example the railway linearity, the structural deformation of the crane.

During a first teaching phase for a specific load, the load is transported along predetermined paths in the hoisting area. The first teaching phase may be enriched during different operating sessions of the hoisting appliance. At consecutive time intervals or specific positions, the control device CD can receive measures of angle offsets of the trolley from the inclinometer INC and correlates the measures with the position of the trolley given by the positioning system PS. The control device CD can thus create a first table giving the angle offsets depending on the mechanical environment. The angle offsets may lead to an undesirable angle measure during the operation of the hoisting apparatus, thus leading to inadequate correction decisions.

The accelerometer ACC and the gyroscope GYR may be linked to the tool and are configured to measure the acceleration and the angular position of the tool. As for the inclinometer, the physical characteristics of the load may be the weight of the load, the dimensions of the load and the center of gravity of the load. The mechanical parameters related to the reeving system may be the length of the cable of the reeving system and the rigidity of the cable.

During a second teaching phase for a specific load, that can be operated at the same time as the first teaching phase, the load is transported along predetermined paths in the hoisting area. The control device CD receives measures of acceleration and angular position from the accelerometer ACC and the gyroscope GYR and correlates the measures with the mechanical parameters related to the reeving system. For example, the length of the cable of the reeving system can vary, for example after picking the load and before putting down the load. It can be deduced from the measures of acceleration and angular position probabilities of secondary sway of the load. The control device CD can thus create a second table giving probabilities of a secondary sway of the load depending on mechanical parameters related to the reeving system, like the length of the cable of the reeving system.

The first teaching phase can be executed for different loads in order to be enriched with the data related to the different loads. The control device CD can thus create a first table giving angle offsets depending on weight of loads and on positions of the trolley. For each position of the trolley, there can be different angle offsets respectively associated with different loads according to their weight. From another point of view, for each load having a specific weight, there is a given angle offset for a given position of the trolley.

The second teaching phase can also be executed for different loads in order to be enriched with the data related to the different loads. The control device CD can thus create a second table giving probabilities of a secondary sway depending of the weight of the loads and depending on the length of the cable reeving system. For a specific load (with a given weight), some lengths of cable can be associated with high probabilities of a secondary sway while some other lengths of cable can be associated with low probabilities of a secondary sway. The second table can provide values of probabilities or classify the probabilities in a set of levels, for example low, medium and high.

The control device CD can communicate with the angle sensor AS and with other command devices of the crane that perform a motion command for the trolley from the control device. There can be a chain of commands between the control device CD and the trolley that are executed by different command devices like sensors, networks, PLCs, a speed driver, a motor etc. . . . . . The angle sensor AS may be linked to the trolley and is configured to measure the angle between the load and the vertical axis.

During a third teaching phase that can be operated at the same time as either the first teaching phase or the second teaching phase, the load can be commanded to move to a given position or to accelerate or decelerate. The control device CD estimate dynamic parameters related to the command devices of the crane, the dynamic parameters being related to time delays of the motion command, including measurement delay, communication delay and processing delay. The control device CD can distinguish delays related to angle measurements of the angle sensor AS and delays related to motion commands from the command devices. The control device CD can thus create a third table giving delays depending on the control environment.

To estimate the time delays of the motion command, the control device CD may use different mechanisms, like interrogating each device for its response time or comparing a new response given by the positioning system PS after a move commanded for the trolley with a response given directly by another accelerometer linked to the trolley.

The control device CD is configured to create a path to be followed by the crane for transporting a load from one place within the hoisting area to another. Usually, an anti-sway algorithm is used for the damping of sways of a load during the operation of the bridge crane, which provides the increase of a mechanism performance, reduces the risk of accidents and traumatic situations. Methods that are used to achieve this goal may include mathematical modeling and computer simulation. An anti-sway system is based on the use of a load angle sensor with internal variables of the electric drive system. For example, an anti-sway algorithm takes as inputs dynamic parameters of hoisting appliance comprising the current position of the trolley and the current angle of the load with respect to the trolley.

However, to be more reactive to damp the sway of the load, the anti-sway algorithm may take into account the mechanical environment of the crane that leads to angle offsets of the trolley, the dynamic behaviour of the load corresponding to a secondary sway of the load and the control behaviour of the chain of command by means respectively of the first table, the second table and the third table. It is assumed that a first table, a second table and a third table are produced for a specific load and are used with the anti-sway algorithm when a load similar to said specific load is transported.

The first table provides to the anti-sway algorithm real-time angles offset to be taken into account for regulation depending on the current position of the trolley and the load. The regulation of anti-sway algorithm may consist in a shifting of the trolley if it is in a stationary mode or in an acceleration or deceleration of the trolley it is in motion mode.

The second table adapts regulation coefficients of the anti-sway algorithm to be smoother when there is high probability (risk) of secondary sway or to be tighter when there is low probability (risk) of secondary sway depending on the length of the cable and the load. The regulation coefficients may be linked to different kinds of regulation loop using correction factors. In one example, the correction factor is proportional to an error corresponding to the result of a difference between an order (value to reach) and a measure. Per default, the order may correspond to an angle of 0° as normal operating condition should be to have an axis of the reeving system (cable) being vertical. If a measure gives an angle of 3°, the error is −3°. The correction factor is the result of a multiplication of the error by a regulation coefficient or a gain.

For example, the control device CD can allow the trolley to travel at higher speed when there is no risk of secondary sway or to change speed or accelerate without changing the regulation coefficient. If there is higher risk of secondary sway, the regulation coefficient is reduced as a too big change of speed or acceleration may lead to secondary sway.

The third table provides real delays parameters for the setting of the anti-sway algorithm whatever the type a load that is transported, allowing the anti-sway algorithm to anticipate the time at which the move order sent the trolley becomes effective.

Figure 3:
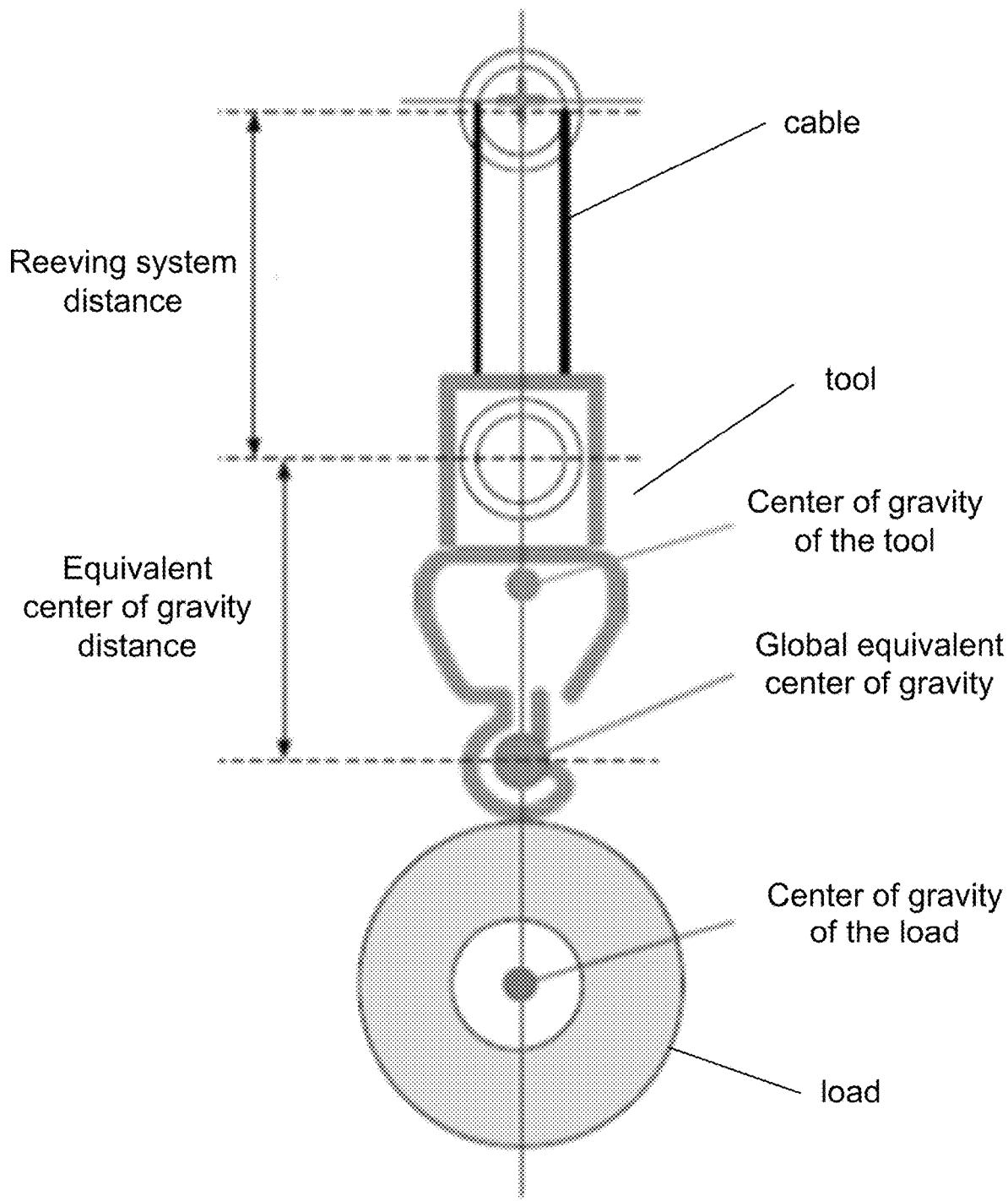
FIG. 3 illustrates elements of the hoisting appliance involved in a secondary sway.

Referring to FIG. 3, some elements of the hoisting appliance involved in a secondary sway are illustrated. The hoisting appliance comprises a trolley controlling the length of a cable of a reeving system that is linked at the bottom to a tool handling a load or product. The cable is linked to the trolley via an upper block and is linked to the tool via a lower block.

The position of the center of gravity of the tool depends on the type of the tool and the center of gravity of the load is more or less at the middle of the load. The global equivalent center of gravity of the combination of the tool and the load is situated between the center of gravity of the tool and the center of gravity of the load: the heavier the load, the closer the global equivalent center of gravity is to the center of gravity of the load.

A secondary sway phenomena may occur when the reeving system distance is small, corresponding more or less to the length of the cable between the trolley and the tool, i.e. between the center of the upper block, like a pulley, and the center of the lower block, like a pulley also. A secondary sway phenomena may depend also on the global equivalent center of gravity.

Figure 4:
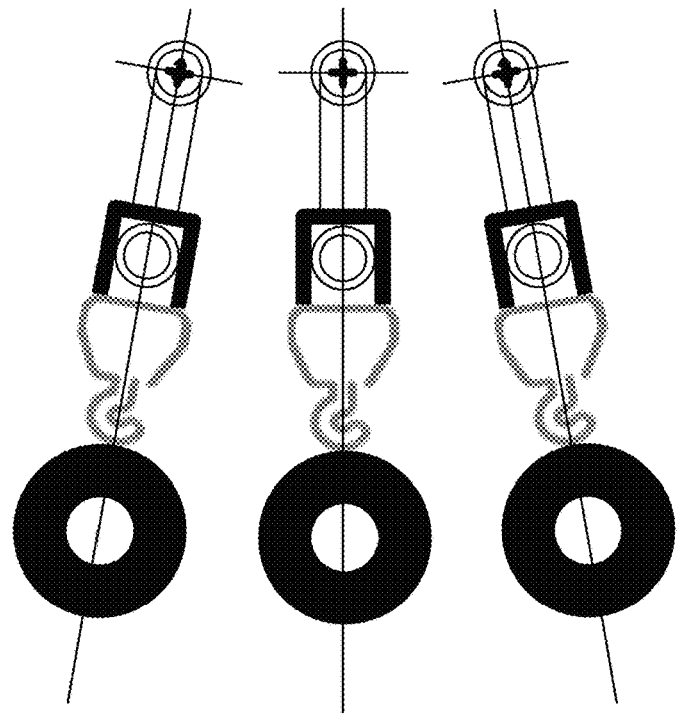
FIG. 4 illustrates a difference between the primary sway and the secondary sway.
Figure 4:
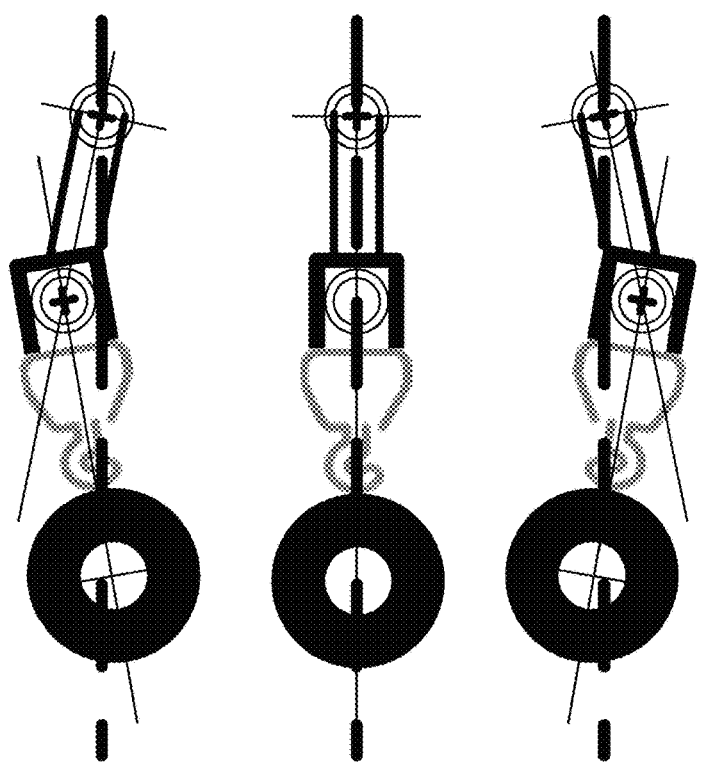

Referring to FIG. 4, the difference between the primary sway and the secondary sway is illustrated. In case of primary sway, the load may balance in an arc below the trolley from the vertical axe, in a direction parallel to the trolley travel direction. The rotation axis is situated around the upper part of the reeving system linked to the trolley. In case of secondary sway, the tool may further balance in an arc below the trolley from the axe of the global equivalent center of gravity, in a direction parallel to the trolley travel direction. The rotation axis is situated between the lower part of the reeving system linked to the tool and the center of gravity of the load.

Figure 5:
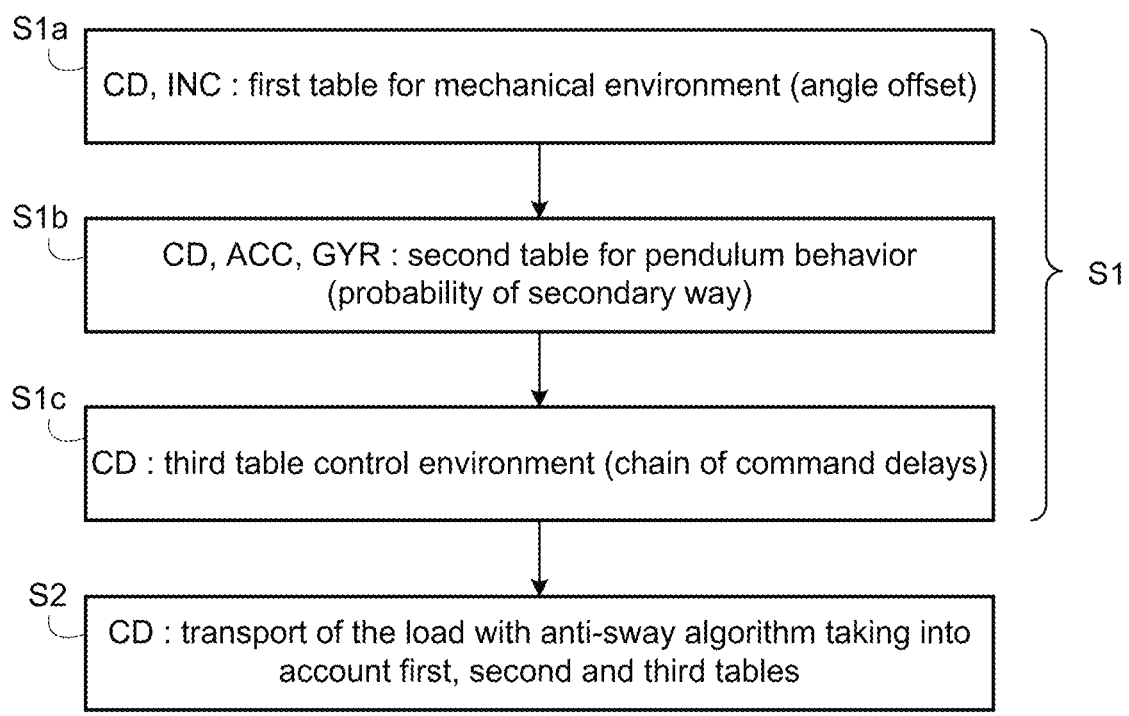
FIG. 5 illustrates a flow chart illustrating a method for optimizing an anti-sway algorithm for the transport of a load by a hoisting appliance according to one embodiment.

With reference to FIG. 5, a method for optimizing an anti-sway algorithm for the transport of a load by a hoisting appliance according to one embodiment of the invention comprises steps S1 and S2.

In step S1, the control device CD initiates teaching phases for different loads during which it is analyzed and calculated the mechanical environment of the hoisting appliance, the pendulum behavior of the tool with the load and delays depending on the control environment. During the teaching phases, the load can be transported in different zones in order to cover the whole hoisting area and the control device CD receives measures from the set of sensors for given positions.

In a sub-step S1$a$, the control device CD receives measures of angle offsets from the inclinometer INC and correlates the measures with the position of the trolley and the load. The control device CD creates a first table giving the angle offsets depending on the mechanical environment. The angle offset at a given position and load allows to correct a measure of angle by the angle sensors at said given position.

In a sub-step S1$b$, the control device CD receives measures of acceleration and speed from the accelerometer ACC and the gyroscope GYR and correlates the measures with the length of the cable. The control device CD creates a second table giving probabilities of a secondary sway of the loads depending on mechanical parameters related to the load and the reeving system like the length of the cable.

In a sub-step S1$c$, the control device CD estimates the different time delays due to information processing by the chain of commands. The control device CD creates a third table giving delays depending on the control environment.

In step S2, the control device CD generates a trajectory of the hoisting appliance for transporting a given load through the hoisting area from a starting point to a target point. The control device CD commands the trolley to start the transport of the load and uses the anti-sway algorithm to adapt the behavior of the trolley during the transport.

The anti-sway algorithm takes as inputs dynamic parameters of hoisting appliance comprising the current position of the trolley and the current angle of the load with respect to the trolley. In real time, the current position of the trolley is provided by the positioning system PS and the current angle of the load with respect to the trolley (assumed to be the angle between the load and the vertical axis) is provided by the angle sensor AS linked to the trolley.

The anti-sway algorithm uses the angle offsets of the first table for the given load and takes as inputs the current position of the trolley and the current angle of the load with respect to the trolley to determine real-time angle offsets to be taken in account for regulation. For example, at a given position the angle sensor AS provides a measure of 1° for the current angle. The first table contains for said given position a value for an angle offset. If the value is also 1°, it means there is no correction to apply. If the value is different from 1°, a regulation should be applied to compensate or avoid this angle offset, for example by moving the trolley to another position.

The anti-sway algorithm analyses the probabilities of secondary sway for the given load and adapts coefficients of a regulation loop when probabilities of secondary sway change with the length of the cable of the reeving system.

For the given load, the probabilities of secondary sway depend on the possible different lengths of the cable of the reeving system used during operation of the trolley. For some lengths of the cable of the reeving system, the probabilities of secondary sway may be high and the coefficients of the regulation loop may be reduced.

The anti-sway algorithm uses the third table to anticipate the trigger of move commands and thus the time at which move commands are effectively executed by the trolley.

The anti-sway algorithm uses the first table, the second table and the third table to better adapt the behavior of the trolley during the transport.

An embodiment comprises a control device CD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for optimizing an anti-sway algorithm for the transport of a load by a hoisting appliance spanning a hoisting area and comprising a trolley, a reeving system and a tool handling the load, the method comprising in a control device:
creating a first table giving angle offsets of the trolley, depending on physical characteristics of the load and on mechanical parameters related to the trolley, the angle offsets being determined by measurements of inclination angles of the trolley,
creating a second table giving probabilities of a secondary sway of the load depending on physical characteristics of the load, on mechanical parameters related to the reeving system and on measurements of acceleration and angular position of the tool, and
transporting the load in the hoisting area by using an anti-sway algorithm taking into account the first table and the second table, wherein anti-sway algorithm takes as inputs dynamic parameters of hoisting appliance comprising the current position of the trolley, the load and the current angle of the load with respect to the trolley.

2. The method according to claim 1, further comprising creating a third table comprising global command delays depending on motion commands from the control device to the trolley, and wherein the anti-sway algorithm further takes into account the third table.

3. The method according to claim 2, wherein the third table further comprises an angle measurement delay from an angle sensor linked to the trolley.

4. The method according to claim 2, wherein the anti-sway algorithm uses the third table to anticipate a trigger of motion commands that are effectively executed by the trolley after global command delays.

5. The method according to claim 1, wherein the mechanical parameters related to the trolley include at least the position of the trolley.

6. The method according to claim 1, wherein the physical characteristics of the load include at least the weight of the load.

7. The method according to claim 1, wherein the mechanical parameters related to the reeving system include at least the length of a cable of the reeving system.

8. The method according to claim 7, wherein the anti-sway algorithm analyses the probabilities of secondary sway for the given load and adapts coefficients of a regulation loop when probabilities of secondary sway change with the length of the cable of the reeving system.

9. The method according to claim 8, wherein the coefficients are link to correction factors of a regulation loop, a coefficient corresponding to a change of speed, an acceleration or a deceleration of the trolley.

10. The method according to claim 1, wherein the measurements of inclination angles of the trolley are performed by an inclinometer linked to the trolley.

11. The method according to claim 1, wherein the measurements of acceleration and angular position of the tool are performed by an accelerometer and a gyroscope linked to the tool.

12. The method according to claim 1, wherein the anti-sway algorithm uses the angle offsets of the first table for the given load and takes as inputs the current position of the trolley and the current angle of the load with respect to the trolley to determine real-time angle offsets to be taken in account for a regulation loop of the anti-sway algorithm.

13. A non-transitory computer-readable medium having embodied thereon a computer program for executing the method according to claim 1.

14. An apparatus for optimizing an antisway function for the transport of a load by a hoisting appliance spanning a hoisting area and comprising a trolley, a reeving system and a tool handling the load, the apparatus comprising:
- one or more network interfaces to communicate with a telecommunication network;
- a processor coupled to the network interfaces and configured to execute one or more processes; and
- a memory configured to store a process executable by the processor, the process when executed operable to:
- create a first table giving angle offsets of the trolley leading to a primary sway of the load, depending on physical characteristics of the load and on mechanical parameters related to the trolley, the angle offsets being determined by measurements of inclination angles of the trolley,
- create a second table giving probabilities of a secondary sway of the load depending on physical characteristics of the load, on mechanical parameters related to the reeving system and on measurements of acceleration and angular position of the tool,
- transport the load in the hoisting area by using an anti-sway algorithm taking into account the first table and the second table, wherein anti-sway algorithm takes as inputs dynamic parameters of hoisting appliance comprising the current position of the trolley, the load and the current angle of the load with respect to the trolley.

* * * * *